UNITED STATES PATENT OFFICE.

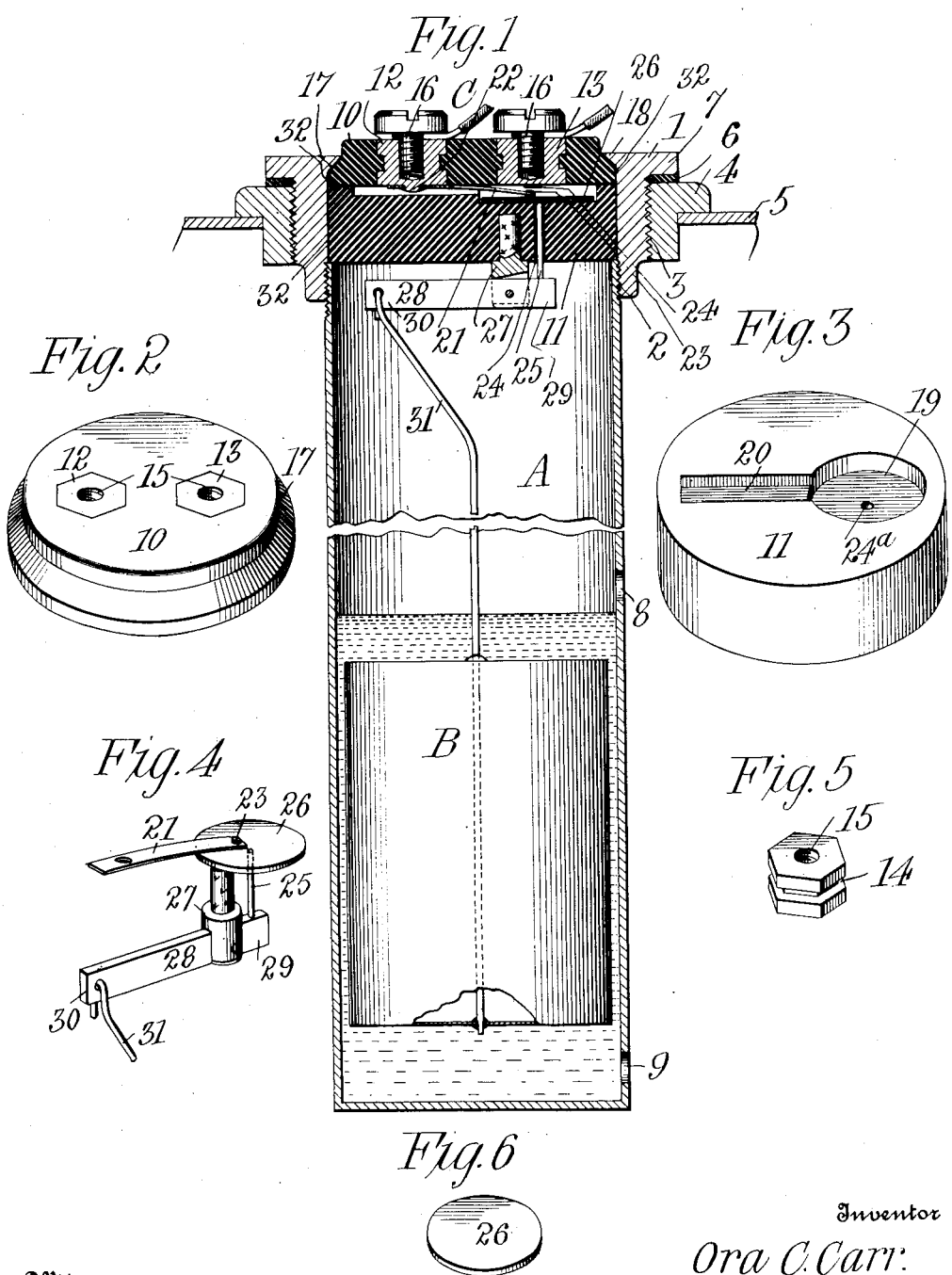

ORA C. CARR, OF LANSING, MICHIGAN.

ELECTRIC LOW-LEVEL SIGNAL FOR TANKS.

1,095,811.  Specification of Letters Patent.  Patented May 5, 1914.

Application filed July 26, 1912. Serial No. 711,703.

*To all whom it may concern:*

Be it known that I, ORA C. CARR, a citizen of the United States, residing at Lansing, in the county of Ingham and State of Michigan, have invented certain new and useful Improvements in Electric Low-Level Signals for Tanks, of which the following is a specification.

This invention relates to electric signals for indicating the low level of liquid in tanks or other receptacles, and is especially adapted for use in connection with automobile gasolene tanks whereby an electric light on the dashboard or any other suitable signal is energized to warn the driver when the level of the gasolene reaches a predetermined minimum, as for instance, when there remains sufficient gasolene to enable the car to be driven a distance of twenty miles, more or less, which would ordinarily be ample distance to reach a station where the new charge of gasolene could be obtained. A low level signal circuit-closing means of this character is disclosed in United States Patent No. 988,859, granted to me April 4, 1911.

It is the object of the present invention to improve the said patented device by materially reducing the number of parts and simplifying the structure so as to be comparatively easy and inexpensive to manufacture and at the same time more reliable and positive in operation.

Another object of the invention is the provision of a novel arrangement of contacts and float-operating means whereby a light or other signal circuit will be closed when the liquid level drops to a certain point.

A further object is to provide a device suitable for insertion in the ordinary filling plug of a tank, the device being so constructed that it will be perfectly air-tight so that the tank may operate under pressure.

With these and other objects in view, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a vertical longitudinal section of the device. Fig. 2 is a perspective view of the upper section of the cap or top of the device. Fig. 3 is a perspective view of the lower portion thereof. Fig. 4 is a perspective view of the means for operating the movable contact. Fig. 5 is a perspective view of one of the binding post bushings. Fig. 6 is a perspective view of the fiber disk on which the free end of the movable contact bears.

Similar reference characters are employed to designate corresponding parts throughout the views:—

Referring to the drawings, A designates the float inclosing tube, which tube is preferably a straight cylindrical or other body that is preferably closed at its lower end to prevent the motion of the gasolene or other liquid from agitating the float B, which is movably mounted in the lower portion of the protecting tube A. The upper end of the tube is attached to a cap or head ring 1 in any suitable manner, as for instance, by the tube A being externally threaded at 2 and screwed into the lower end of the ring 1. The ring, in turn, has external threads 3 to screw into the threaded filling opening ring 4 of the gasolene or other tank 5, and in case the tank is adapted to be under pressure, a packing ring 6 is inserted between the outer surface of the ring 4 and the annular flange 7 of the ring 1. The protecting tube A has apertures 8 and 9, respectively, adjacent the top and bottom of the float, whereby gasolene or other liquid can enter the tube and change its level therein in accordance with the changing in level of the liquid in the tank with which the device is used.

Mounted within the cap ring 1 is a cap C which consists of upper and lower disk-shaped bodies or plates 10 and 11 of insulating composition or the like, which are pressed or otherwise shaped to the desired form. The upper section 10 of the cap contains binding post bushings 12 and 13 which are of brass or other suitable metal and have peripheral grooves 14 so as to securely anchor them in the insulation. These bushings are set in a mold and the insulation placed therein and compressed so that no fastening means are required to hold the bushings in place, and these bushings are provided with tapped bores 15 for receiving the screws 16 whereby the terminal wires of the signal circuit are connected with the device. The periphery of the upper section 10 has a beveled shoulder 17 with which engages a correspondingly-shaped flange 18 on the cap ring 1.

The lower section 11 of the cap C is molded with a circular chamber 19 from which extends a shallow channel 20 which is under the binding post bushing 12, while the chamber 19 is under the binding post bushing 13. This chamber and channel accommodates a leaf spring contact 21 which is secured at 22 to the binding post 12. The free end of the contact, which extends into the chamber 19, carries a platinum contact pin 23 adapted to engage a contact point 24 on the bottom of the binding post bushing 13, the spring being normally tensioned away from said bushing so that the platinum contact points will be normally separated. A vertical passage 24ª is provided in the section 11 of the cap, which passage extends from the bottom of the chamber 19 entirely through the section 11, and slidably mounted in this passage is a pin 25 which has its upper end bearing against the bottom of a bodily movable fiber disk or equivalent element 26 that is disposed in the chamber 19.

Anchored in the section 11, by being molded therein, is a pivot post 27 that extends downwardly from the bottom of the section 11 and has fulcrumed thereon a lever 28, the lever being so disposed that its short arm 29 is in line with and directly under the pin 25 so that the lower end of the latter will rest on the upper edge of the lever. The long arm 30 of the lever has its outer end connected with a stem 31 attached to and rising from the float B.

The cap C is clamped between the tube A and cap ring 1. It will be observed that the lower section 11 of the cap C bears on the upper end of the protecting tube A, and when the cap ring is screwed on to the tube, the cap C is clamped in position. If it is desired to render the device air-tight, the cap may be cemented in the ring 1, as indicated at 32, and furthermore the two sections 10 and 11 of the cap may be cemented together to form a unitary body.

In describing the operation of the device, it will be assumed that the binding posts are connected with an electric circuit containing a suitable signal, such for instance as a red lamp on the dashboard of a vehicle. When the float is raised by the level of the liquid in the tank being above a predetermined low level, the circuit will be, of course, opened, since the spring contact 21 is separated from the fixed contact point 24. When the level of the liquid in the tank falls to a predetermined point, the weight of the float is brought to bear on the lever 28, and as a result, the short arm of the lever is raised and communicates motion through the pin 24 and insulating disk 26 to the spring contact 21 whereby the contact point 23 thereof is engaged with the contact point 24. The signal circuit is thus completed and the lamp or other signal energized. The driver is consequently warned that there is a certain amount of gasolene or other liquid in the tank which will enable him to run a given distance, and before that distance is traversed he must re-charge the tank. Of course, the electric circuit will contain a switch so that the current can be cut off and the energy of the battery saved after the driver sees the signal light. When the tank is recharged, of course the parts of the circuit made and break device will be restored to the normal position shown in the drawings, and after the manual switch in the circuit is again closed, the device is ready to operate when the tank becomes again nearly exhausted.

It will be noted that the upper portion of the tube forms an air or gas space so that gasolene or other liquid never rises to the contacts in the cap, and consequently there is no danger of an explosion due to a spark being generated between the contacts, and furthermore the fiber disk 26 may operate as a valve to close the upper end of the pin passage 24ª to prevent the propagation of a flame into the gasolene tank, should ignition result from a spark between the contacts upon separating.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. A device of the class described comprising a float-protecting tube, a cap ring with which the tube is connected, a cap of insulation mounted and fitted within the ring, contacts wholly within the cap, a float within the casing, and means carried by and mounted on the cap and connected with the float for moving the contacts into engagement when the float moves to a predetermined point.

2. The combination of a cap of insulation, relatively movable contacts therein, a lever mounted on the cap and disposed under the same, means extending into the cap from the lever to the contacts for moving the latter into engagement with each other, and a float connected with the lever.

3. A device of the class described comprising a cap of insulation composed of two sections formed with a chamber between them, relatively movable contacts in the said chamber, there being a passage leading from the chamber, a member slidable in the passage to move the contacts into engagement with each other, and a float-operated means for actuating the member.

4. A device of the class described comprising a body of insulation containing a chamber, a fixed contact in the chamber, a movable contact in the chamber, there being a passage leading from the chamber, a member slidable in the passage to engage the movable with the fixed contact, a lever fulcrumed on the body and serving to retain the said member in the passage, and a level-responsive device connected with the lever.

5. A device of the class described comprising an insulating cap composed of upper and lower sections, normally separated contacts on the upper section, one contact being movable, said lower section having a passage at one side of the center thereof, a slidable member in the passage, a disk loose from and disposed over one end of the said member and interposed between the said member and movable contact, and operating means mounted on and under the said cap and engaged with and holding the said member in the said passage.

6. A device of the class described comprising a body of insulation having a chamber, a bodily movable disk of insulation in the chamber, a vertically-movable member engaging the disk, a lever fulcrumed under the body and by which the member is retained, a float connected with the lever, and normally separated circuit-closing contacts in the body arranged to be engaged with each other by the movement of the said disk.

7. A device of the class described comprising a cap of insulation having a chamber, relatively movable contacts in the chamber and normally separated, a passage extending downwardly from the chamber, a member longer than and extending through the passage, a bodily movable element between the inner end of the member and the movable contact, a pivot post mounted on the cap, a lever fulcrumed on the post and with which the lower end of the member is engaged, and a float connected with the lever.

8. A device of the class described comprising a float protecting casing, a float in the lower portion thereof and normally exerting an upward pressure due to its buoyancy, a member extending upwardly from the float, a chambered cap in the top of the casing, a lever fulcrumed on and under the cap and having one end connected with said float member and urged upwardly by the float, normally separated fixed and movable circuit-closing contacts in the chamber of the cap, and a slidable member mounted in the cap for actuating the movable contact, said member having its lower end engaged with the end of the lever opposite from that connected with the float for actuation by the lever.

9. A device of the class described comprising a cap ring having an internal shoulder at one end and an internal thread at the other, a body of insulation fitted in the ring and engaging the said shoulder, a float-containing tube threaded in the ring and engaging the said body of insulation, circuit-closing means within the said body of insulation, and a float carried by the said body and arranged to operate the circuit-closing means.

10. A device of the class described comprising an insulating cap composed of upper and lower sections, binding posts in the upper sections, a movable contact on one of the binding posts and arranged to engage the other binding post, the lower section being provided with a chamber and a passage leading therefrom, an insulation element disposed in the chamber and under the circuit-closing end of the movable contact, a slidable member disposed in and longer than the passage with one end engaged with the said element, a lever fulcrumed on the said lower section of the cap and engaged with the said member for moving the same, and a float connected with the lever.

11. A device of the class described comprising a float inclosing tube, a cap ring attached thereto and having an internal flange, a body of insulation disposed within the ring and retained between the flange thereof and the end of the said tube, circuit-closing means within the body, and a float-operated means carried by the body and operatively related to the circuit-closing means.

In testimony whereof I affix my signature in presence of two witnesses.

ORA C. CARR.

Witnesses:
CHATTEN BRADWAY,
JOHN A. MASSIE.